(12) United States Patent
D'Souza et al.

(10) Patent No.: US 11,797,035 B2
(45) Date of Patent: Oct. 24, 2023

(54) TRANSIENT RESPONSE OF A VOLTAGE REGULATOR

(71) Applicant: Ningbo Aura Semiconductor Co., Limited, Ningbo (CN)

(72) Inventors: Arnold J D'Souza, Bangalore (IN); Shyam Somayajula, Bangalore (IN)

(73) Assignee: Ningbo Aura Semiconductor Co., Limited, Zhejiang (CN)

( * ) Notice: Subject to any disclaimer, the term of this patent is extended or adjusted under 35 U.S.C. 154(b) by 9 days.

(21) Appl. No.: 17/646,871

(22) Filed: Jan. 4, 2022

(65) Prior Publication Data
US 2022/0350354 A1 Nov. 3, 2022

(30) Foreign Application Priority Data

May 3, 2021 (IN) .............................. 202141020188

(51) Int. Cl.
*G05F 1/56* (2006.01)
*H04B 1/40* (2015.01)

(52) U.S. Cl.
CPC ..................... *G05F 1/56* (2013.01); *H04B 1/40* (2013.01)

(58) Field of Classification Search
CPC .. H02M 3/156; H02M 3/1563; H02M 3/1566; H02M 3/157; H02M 3/158;
(Continued)

(56) References Cited

U.S. PATENT DOCUMENTS 7,402,984 B1 7/2008 Huang
7,627,294 B2 * 12/2009 Rofougaran .......... H03F 1/0294
455/114.3
(Continued)

FOREIGN PATENT DOCUMENTS

CN 102331807 B 1/2012
CN 103336548 B 10/2013
CN 105116955 B 12/2015

OTHER PUBLICATIONS

Patrick Kofi Mensah Dollie,Low-Dropout Regulator With Transient Response Enhancement Based on a Bang-Bang Technique, May 2018,91 Pages.
Robert J. Milliken, Jose Silva-Martínez and Edgar Sánchez-Sinencio, Full On-Chip CMOS Low-Dropout Voltage Regulator, Sep. 9, 2007,pp. 1879-1890, vol. 54, No. 9.
Guru Prasad and Kumara Shama, A low dropout voltage regulator with a transient voltage spikes reducer and improved figure of merit,Jan. 27, 2020,pp. 500-508, doi:10.3906/elk-1904-203, Tübitak, Turkey.

(Continued)

*Primary Examiner* — Diana J. Cheng
(74) *Attorney, Agent, or Firm* — IPHORIZONS PLLC; Narendra Reddy Thappeta

(57) ABSTRACT

A voltage regulator includes a slew-up circuit, a slew-down circuit and a transient response control circuit, and provides a regulated output voltage. The slew-up circuit is designed to couple a first node of the voltage regulator to a first constant reference potential upon occurrence of a first condition of the regulated output voltage. The slew-down circuit is designed to couple the first node to a second constant reference potential upon occurrence of a second condition of the regulated output voltage. The transient response control circuit is designed to disable the slew-up circuit and the slew-down circuit upon the rate of change of the regulated output voltage exceeding a predetermined rate. The first node is one of an output node and an output steering node of the voltage regulator. Transient response of the voltage regulator is accordingly improved.

16 Claims, 10 Drawing Sheets

(58) Field of Classification Search
CPC ............ H02M 3/1582; H02M 3/1584; H02M 3/1586; H02M 3/1588; G05F 1/56; G05F 1/563; G05F 1/565; G05F 1/569; G05F 1/571; G05F 1/66; G05F 1/70
See application file for complete search history.

(56) References Cited

U.S. PATENT DOCUMENTS

| | | | |
|---|---|---|---|
| 8,344,713 | B2 | 1/2013 | Shrivas et al. |
| 8,860,389 | B2 | 10/2014 | Gakhar et al. |
| 9,857,816 | B2 | 1/2018 | Bhattad |
| 9,958,890 | B2 | 5/2018 | Zanchi |
| 2009/0237854 | A1 | 9/2009 | Mok et al. |
| 2014/0253076 | A1 | 9/2014 | Utsunomiya |
| 2014/0266093 | A1* | 9/2014 | Isham ............... H02M 3/157 323/271 |

OTHER PUBLICATIONS

Mohammad Usaid Abbasi, Tanvir Ahmad Abbasi, Mohammad Suhaib Abbasi and Azeem Hasan, An Improved Fast Transient Response Low Dropout Voltage Regulator, Jun. 2009, 4 Pages, DOI: 10.1109/ISCAS.2009.5117879 , IEEE.
What is the main cause of high overshoots and undershoots in LDOs? and how can I decrease these shoots ? https://www.researchgate.net/post/What_is_the_main_cause_of_high_overshoots_and_undershoots_in_LDOs_and_how_can_I_decrease_these_shoots. downloaded circa Jun. 10, 2021, 01 Page.
Brian M. King, Understanding the load-transient response of LDOs, Nov. 2000,pp. 19-23.
LDO Basics, Oct. 28, 2020, 23 Pages, Texas Instruments.

* cited by examiner

TRANSIENT RESPONSE OF A VOLTAGE REGULATOR

PRIORITY CLAIM

The instant patent application is related to and claims priority from the co-pending India provisional patent application entitled, "Method to Improve Transient Response of an LDO", Serial No.: 202141020188, Filed: 3 May 2021, which is incorporated in its entirety herewith to the extent not inconsistent with the description herein.

BACKGROUND

Technical Field

Embodiments of the present disclosure relate generally to voltage regulators, and more specifically to improving transient response of voltage regulators.

Related Art

Voltage regulators are often used for providing constant voltage supply for electronic circuitry, as is well known in the relevant arts. A voltage regulator receives an input voltage (e.g., from a power source) and generates a regulated output voltage of constant magnitude for a given range of input voltages and load currents. Voltage regulators may be linear voltage regulators (e.g., linear drop-out regulators, LDOs) or switching voltage regulators.

Each voltage regulator is characterized by its ability to respond to transient situations where the output voltage fluctuates from the desired constant magnitude. Such fluctuations are often due to changes in one or more of input voltage and load current. The voltage regulator may be said to be in a transient state until the output voltage reaches the desired constant magnitude.

The response of the voltage regulator in such a transient state may be referred to as transient response, which is generally quantified in terms of the magnitude of variation from the desired constant magnitude and the time taken to return to the desired constant magnitude of the output voltage.

Several aspects of the present disclosure are directed to improving the transient response of a voltage regulator.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present disclosure, a voltage regulator includes a slew-up circuit and a transient response control circuit. The slew-up circuit is designed to couple a first node of the voltage regulator to a first constant reference potential upon occurrence of a first condition of the regulated output voltage. The transient response control circuit is designed to disable the slew-up circuit upon a rate of change of the regulated output voltage changing from a negative value to a positive value subsequent to occurrence of the first condition. The first node is one of an output node and an output steering node of the voltage regulator. The voltage regulator further includes a slew-down circuit designed to couple the first node to a second constant reference potential upon occurrence of a second condition of the regulated output voltage. The transient response control circuit designed to disable the slew-down circuit upon the rate of change changing from a positive value to a negative value subsequent to occurrence of the second condition.

In an embodiment, the first condition includes an undershoot of the regulated output voltage to a level less than a first threshold voltage, and the second condition includes an overshoot of the regulated output voltage to a level greater than a second threshold voltage. The disabling of the slew-up and slew-down circuits by the transient response control circuit occurs only upon the rate of change of regulated output voltage exceeds a predetermined rate. As a result, transient response of the voltage regulator is improved.

Several aspects of the present disclosure are described below with reference to examples for illustration. However, one skilled in the relevant art will recognize that the disclosure can be practiced without one or more of the specific details or with other methods, components, materials and so forth. In other instances, well known structures, materials, or operations are not shown in detail to avoid obscuring the features of the disclosure. Furthermore, the features/aspects described can be practiced in various combinations, though only some of the combinations are described herein for conciseness.

2. Example Device

Figure 1:
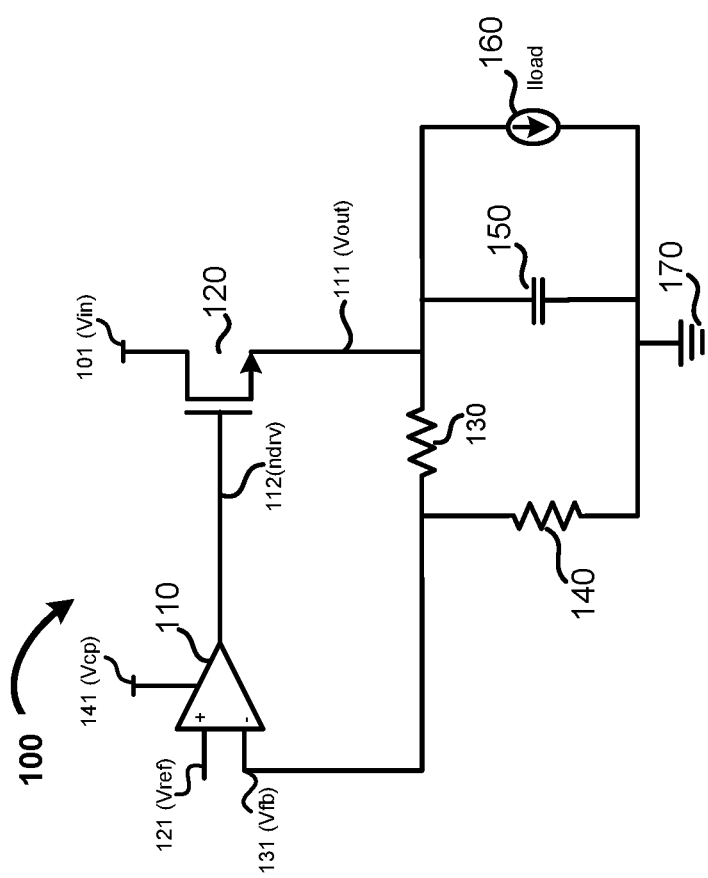
FIG. 1 is a circuit diagram of an example device in which several aspects of the present disclosure can be implemented.

FIG. 1 is a circuit diagram illustrating the details of an example voltage regulator which can be extended according to aspects of the present disclosure. The specific components of voltage regulator 100 of FIG. 1 are shown merely by way of example. However, several aspects of the present disclosure can be implemented in alternative embodiments also, as described briefly in sections below. Further, voltage regulator 100 is shown to be a linear regulator. However, several aspects of the present disclosure are applicable in switching regulators also. Any modifications to the techniques described herein for such other contexts would be obvious to a skilled practitioner upon reading the disclosure provided herein.

Voltage regulator 100 is shown receiving input voltage 101 (Vin) and providing (regulated) output voltage 111 (Vout) at the output node of voltage regulator 100. When Vout 111 is substantially equal to constant magnitude (Vreg), voltage regulator 100 is said to be operating in steady-state condition. Voltage regulator 100 is shown containing error amplifier 110, pass-transistor 120, voltage-divider circuit containing resistors 130 and 140, and output capacitor 150. Voltage regulator 100 may be implemented in integrated circuit (IC) form partly or fully, or in discrete form. A DC source (not shown) provides Vin 101 to voltage regulator 100. Load current 160 (Iload) represents current drawn by load (not shown) of voltage regulator 100. In an embodiment, voltage regulator 100 is implemented as a low-drop-out linear regulator (LDO).

Error amplifier 110 receives reference voltage 121 (Vref) and feedback voltage 131 (Vfb). Vref represents a stable reference DC voltage which is generated internally in voltage regulator 100 in a known way. Vfb 131 is a scaled-down fraction of output voltage Vout 111, and is determined by the ratio of resistors 130 and 140. It is noted here that output voltage Vout 111 can be used as an input to error amplifier 110 (rather than Vfb), with a corresponding change in the value of Vref. Error amplifier 110 is designed to amplify the difference between Vref 121 and Vfb 131, and generates control signal ndrv (112) until Vfb 131 equals Vref 121. Signal ndrv (112) is applied to the gate of pass-transistor 120 (implemented here as an N-type MOS (NMOS) power transistor), and controls the drain-source resistance of power NMOS 120 to maintain Vout 111 at the desired magnitude Vreg.

The combination of error amplifier 110, pass-transistor 120 and the voltage-divider form a feedback loop. Variations in output voltage, Vout, are sensed by the feedback loop, which then adjusts the drain-source resistance of pass-transistor 120 to maintain output voltage Vout 111 substantially constant. Gate (control terminal) of pass-transistor 120 maybe referred to as the output steering node of voltage regulator 100. The drain terminal of pass-transistor 120 is connected to input voltage Vin 101, and the source terminal of pass-transistor 120 provides regulated output voltage, Vout 111.

As is well known in the relevant arts, changes in Iload 160 (load transients) can cause Vout 111 to increase (overshoot) or decrease (undershoot) with respect to Vreg. When Iload 160 increases from its current value, Vout 111 falls below Vreg. Error amplifier 110 senses the fall via Vfb 131 and increases voltage ndrv to bring Vout back to Vreg. A decrease in Iload 160 from its current value would cause Vout 111 to rise above Vreg. Error amplifier 110 senses the rise via Vfb 131 and decreases voltage ndrv to bring Vout 111 back to Vreg. Greater the increase or decrease in Iload 160 from its current value, greater would be the fall and rise in Vout 111 respectively.

However, several factors affect the speed with which the feedback loop corrects any change in Vout. Some of these factors include closed-loop bandwidth of the feedback loop, the capacitance of capacitor 150 (in addition to whether capacitor 150 itself is included or not), the magnitude of rise/fall in Vout, etc. For example, when voltage regulator 100 is implemented as an LDO with an NMOS power transistor (120) (for good power-supply rejection ratio (PSRR)) as in the example of FIG. 1, gate terminal 112 (ndrv) may need to be driven higher than Vin 101. Hence, error amplifier 110 is powered by a voltage 141 (Vcp) which is greater than Vin 101, and which is generated by a charge pump (not shown) within voltage regulator 100. Typically, charge pumps have limited output current capabilities.

Further, there may be stringent Iq (quiescent current) specifications that may limit quiescent/bias current consumption of error amplifier 110. Therefore, the bias current drawn by error amplifier 110 may need to be limited to a small value, for example, 100 μA. In addition, power NMOS needs to be large to support high load currents (Iload). Consequently, gate-source (or gate to bulk/ground capacitance) of power NMOS 120 may be relatively high, for example, of the order of 200 pF (pico Farads) or more. This capacitance needs to be charged or discharged when a load transient occurs, before power NMOS 120 can react to changes in ndrv generated by the feedback loop.

The combination of limited bias current in error amplifier 110 and the large gate capacitance of power NMOS 120 generally results in a slow response of the feedback loop to load transients. As a result, changes in Vout 111 caused due to the load transients may not be corrected sufficiently fast, and such delay may be unacceptable at least in certain environments.

Several features of the present disclosure would be better understood and appreciated when compared with conventional techniques for handling load transients. Accordingly, an example prior technique is briefly described next with respect to FIGS. 2A and 2B.

Figures 2A, 2B:
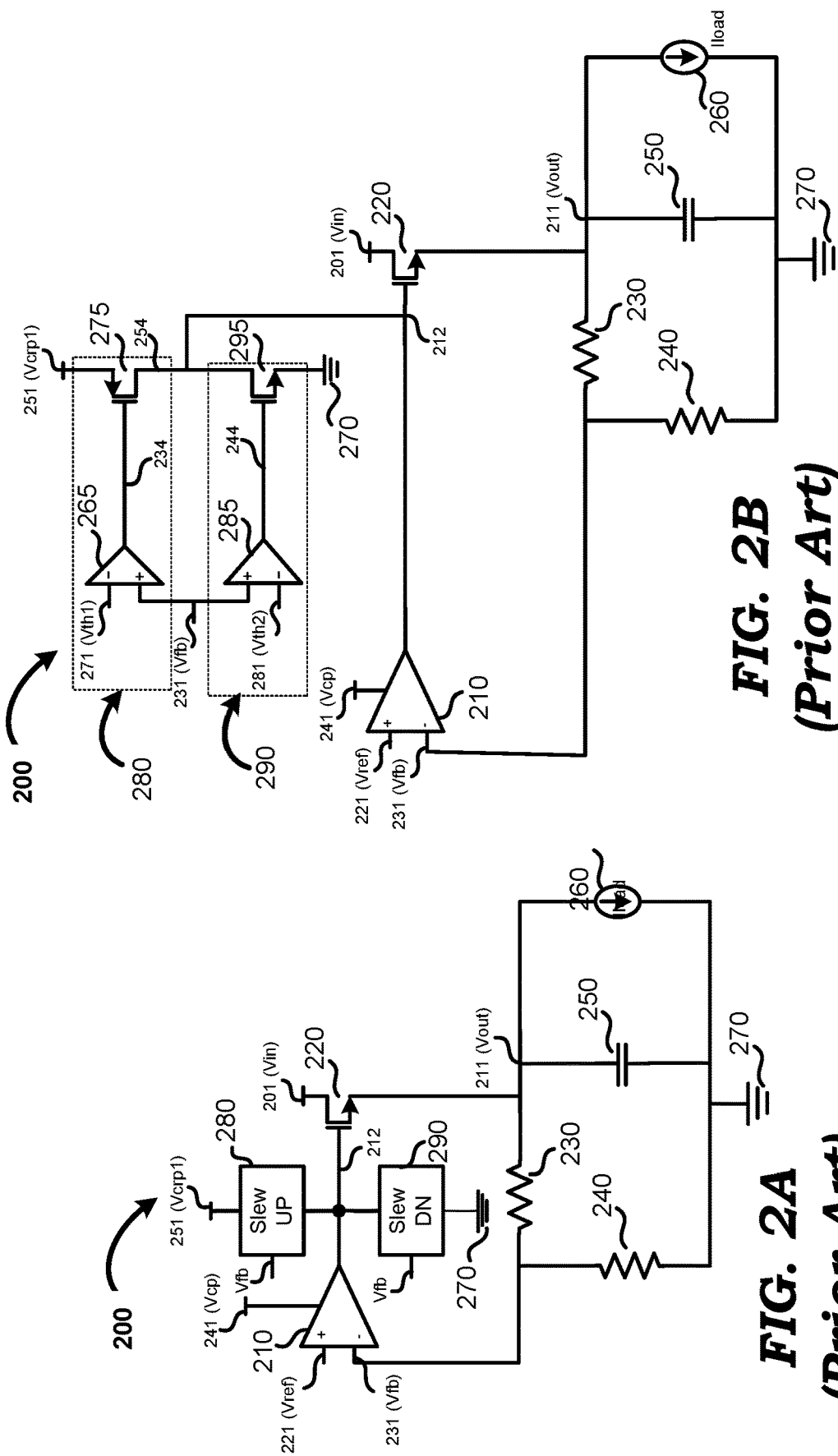
FIGS. 2A and 2B illustrate the use of an alternative path for transient detection and correction in a prior technique.

FIGS. 2A and 2B illustrate the use of an additional path/feedback loop to handle load transients in a prior/conventional technique. FIG. 2A shows a prior voltage regulator 200 that additionally (with respect to voltage regulator 100) contains slew-up circuit 280 and slew-down circuit 290. Components 210, 220, 230, 240, 250 and 260 respectively correspond to components 110, 120, 130, 140, 150 and 160 of FIG. 1, and their description is not repeated here in the interest of conciseness.

Slew-up circuit 280 is shown connected between constant reference potential 251 (Vcrp1) and node 212, while slew-down circuit 290 is shown connected between node 212 and ground 270. Slew-up circuit 280 is designed to quickly pull-up node 212 to Vcrp1 251 upon Vout 211 falling below Vreg or a threshold voltage below Vreg. Slew-down circuit 290 is designed to quickly pull-down node 212 to ground 270 upon Vout 211 exceeding Vreg or a threshold voltage above Vreg.

FIG. 2B illustrates the implementation details of slew-up circuit 280 and slew-down circuit 290 according to the prior technique. Slew-up circuit 280 is shown containing comparator 265 and PMOS (P-channel metal oxide semiconductor) transistor 275. Comparator 265 is shown receiving feedback voltage (Vfb) on positive terminal and threshold voltage (Vth1) on negative terminal. Upon occurrence of an undershoot, Vfb falls below Vth1, comparator 265 generates a logic 0 on path 234 causing gate of transistor 275 to be pulled down (to ground). As a result, node 212 is pulled-up to Vcrp1 251, thereby quickly charging the gate capacitance of pass-transistor 220. Consequently, Vout is quickly corrected to Vreg by slew-up circuit 280. Vcrp1 251 represents a voltage generated internally in voltage regulator 200, for example, by a charge pump different from that generating Vcp 241.

Slew-down circuit 290 is shown containing comparator 285 and NMOS transistor 295. Comparator 285 is shown receiving feedback voltage (Vfb) on positive terminal and threshold voltage (Vth2) 281 on negative terminal. Upon occurrence of an overshoot, Vfb 231 exceeds Vth2 281, comparator 285 generates a logic 1 on path 244 causing gate of transistor 295 to be pulled up (to the supply voltage of comparator 285). As a result, node 212 is pulled-down to ground, thereby quickly discharging the gate capacitance of pass-transistor 220. Consequently, Vout is quickly corrected to Vreg by slew-down circuit 290. Each of comparators 265 and 285 may be powered by a supply source (e.g., charge pump) other than the one providing Vcp, and thus may be Vcrp1 itself.

In FIG. 2B, Vth1 271 and Vth2 281 are respectively slightly (e.g., 5 mV) less than and greater than Vref, rather than equal to Vref. Thus, the slew-up and slew-down circuits are operational only when the value of Vfb is outside the range Vth1 to Vth2, or correspondingly when Vout is outside a corresponding voltage range (referred to below as "output voltage window") as determined by the values of resistors 130 and 140. In an embodiment, the resistance values are such that above-noted corresponding voltage range is +/−50 mV. Slew-up circuit 280 is operational only when Vfb falls below Vth1 and slew-down circuit 290 is operational only when Vfb exceeds Vth2. In other words, the main feedback loop handles changes in Vout (with respect to Vreg) when the value of Vfb is within the range Vth1 and Vth2. However, in general, Vth1 and Vth2 can equal Vref. It is noted that each of comparators 265 and 285 may employ hysteresis of a suitable magnitude.

It may be appreciated that the secondary feedback loop containing the slew-up and slew-down circuits is designed to be faster than the main loop since the charge pump generating Vcrp1 (or the supply voltage of comparators 265 and 285, in general) is designed to be able to source higher current than the one generating Vcp. Hence, the secondary feedback loop operates to handle load transients faster than main loop of voltage regulator 200. Under steady-state conditions (when Vout is substantially equal to Vreg, and there are no transients of sufficient magnitude), transistors 275 and 295 are OFF, and comparators 265 and 285 may consume minimal current. However, the faster (secondary) feedback loop of prior regulator of FIGS. 2A/2B still suffers from some drawbacks. Such drawbacks are illustrated next with respect to FIG. 3.

Figure 3:
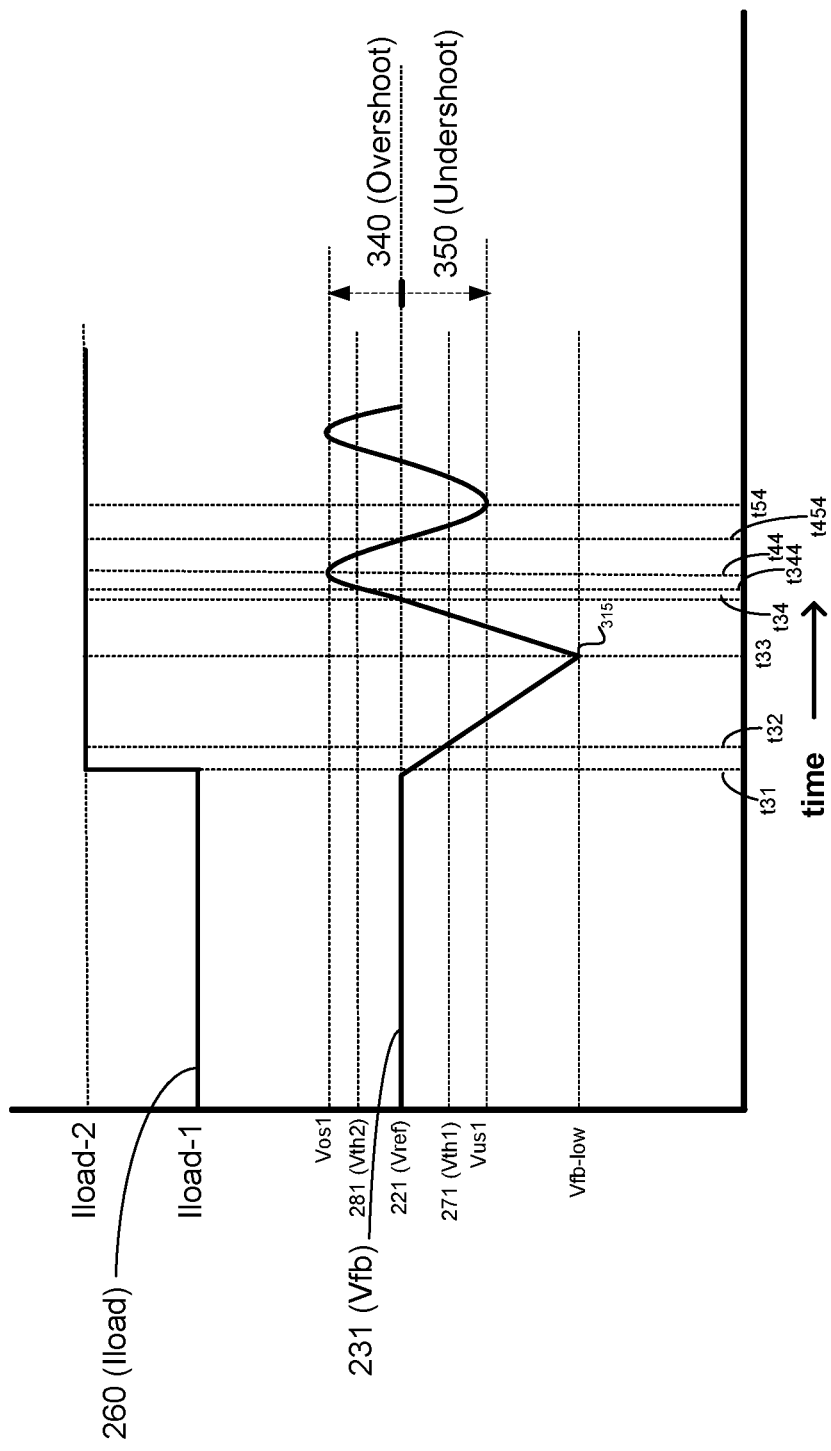
FIG. 3 is a timing diagram illustrating oscillatory nature of transient response in the prior technique.

FIG. 3 is a timing diagram (not to scale) depicting transient response upon occurrence of an undershoot condition in a prior embodiment. Specifically, there are shown the waveforms of load current (Iload) and feedback voltage (Vfb). Although the transient response has been described using an undershoot condition, it may be appreciated that a corresponding situation may be encountered in case of an overshoot condition also.

Voltage regulator 200 is in steady-state condition (Vout being equal to Vreg, and equivalently Vfb being equal to Vref) until time instant t31. Waveform 260 represents Iload, and depicts a step-change from a present value, Iload-1, to a higher value Iload-2, at t31. As a consequence, output voltage, Vout, starts falling from the desired constant magnitude Vreg. This is reflected by falling of Vfb from the value Vref.

At t32, when Vfb falls below Vth1, slew-up circuit 280 (refer FIG. 2B) becomes operational, node 212 is pulled up to Vcrp1 and gate capacitance of power NMOS 220 begins to quickly charge towards Vcrp1. At a time instant (not shown) between t32-t33, current through power NMOS starts to increase towards Iload-2, and the slope of Vfb becomes less steep (although not indicated in FIG. 3).

At t33, when Vfb reaches the valley point 315 (Vfb-low), current through power NMOS 220 equals the load current (Iload-2), and Vfb begins to move back to Vref and may eventually reach the desired regulated value Vref at t34. Correspondingly, Vout moves up to Vreg at t34.

However, slew-up circuit 280 may continue to be operational beyond t34 and pull up gate (212) of power NMOS 220 to more than the Vgs (gate-to-source voltage) value required to just correct the undershoot. This may occur due to factors such as the combined effect of speed of correction by slew-up circuit and delay in detecting value of Vout via Vfb in the secondary feedback loop. As a result, Vout goes higher than Vreg, and Vfb goes higher than Vref. Vfb may then exceed threshold Vth2 at t344 (between t34 and t44), and overcorrects for the undershoot, thereby resulting in an overshoot condition. The overshoot may cause Vfb to rise to the value Vos1 (magnitude of overshoot). Due to the occurrence of overshoot, slew-down circuit 290 gets triggered at t344 although such triggering is not a direct result of Iload. As a result, Vfb falls below Vref at t454 as shown in FIG. 3. Such unintended overshoot correction by slew-down circuit 290 may in turn lead to undershoot condition at t54. The undershoot may cause Vfb to continue to fall until it equals Vus1 (magnitude of undershoot) at t54, from which point Vfb begins to rise back to Vref. Thus, Vout (and Vref) exhibit a sustained (non-decaying) oscillatory transient response as depicted in FIG. 3. In the illustration of FIG. 3, the effects of the main feedback loop have been ignored. In general, it is noted here that the closed-loop response of the secondary feedback loop may be such that Vout either exhibits sustained oscillations as shown in FIG. 3, or at least the oscillations take an unacceptably long duration to die out.

Thus, although the secondary feedback loop quickly responds to load transients, there still exists the drawback of oscillatory transient response due to the secondary feedback loop. A voltage regulator implemented according to several aspects of the present disclosure improves the transient response by minimizing the duration of the oscillatory transient response (caused by potential overcorrection by the slew-up and slew-down circuits as noted above) or completely eliminating it, as described in detail below with respect to example embodiments.

3. Transient Response Control Circuit

According to an aspect of the present disclosure, a voltage regulator includes a transient response control circuit in addition to a slew-up and slew-down circuit, and which operates to improve the transient response provided by the slew-up and slew-down circuits alone. Further, the slew-up and slew-down circuits are modified correspondingly to be controlled by the transient response control circuit. The transient response control circuit is designed to disable the pull-up and pull-down paths provided respectively by the modified slew-up and slew-down circuits thereby minimizing unintended overcorrection of Vout.

Figure 4:
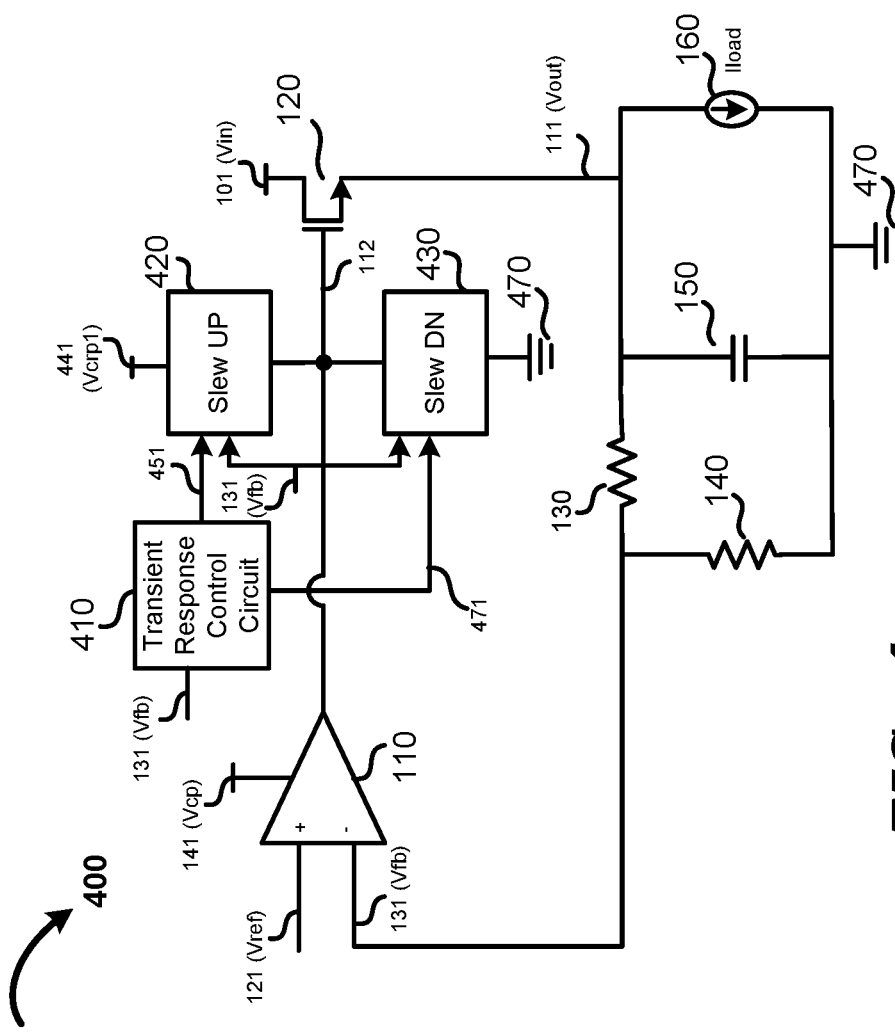
FIG. 4 is a block diagram of a voltage regulator implemented in an embodiment of the present disclosure.

FIG. 4 is a block diagram of a voltage regulator implemented according to several aspects of the present disclosure, in an embodiment. Voltage regulator 400, which may be implemented in place of voltage regulator 100 of FIG. 1, is shown containing transient response control circuit 410, slew-up circuit 420 and slew-down circuit 430 in addition to the components of voltage regulator 100. Components error amplifier 110, pass-transistor 120, resistors 130 and 140, and capacitor 150 correspond to those in FIG. 1, and their description is not repeated here in the interest of conciseness.

Referring to FIG. 4, transient response control circuit 410 respectively disables slew-up circuit 420 via disable signal 451, and slew-down circuit 430 via disable signal 471 at an appropriate time following an undershoot or an overshoot. The implementation details of transient response control circuit 410 in an embodiment of the present disclosure are described below with respect to FIGS. 5A-5B. It is noted here that Vfb is a scaled-down fraction of Vout. Therefore, any change in Vfb and any comparison of Vfb with respect to threshold voltages would translate to a corresponding change in Vout and corresponding threshold voltages. Hence, in terms of describing the regulators operation, Vfb and Vout may be used interchangeably with corresponding assumptions.

Figures 5A, 5B:
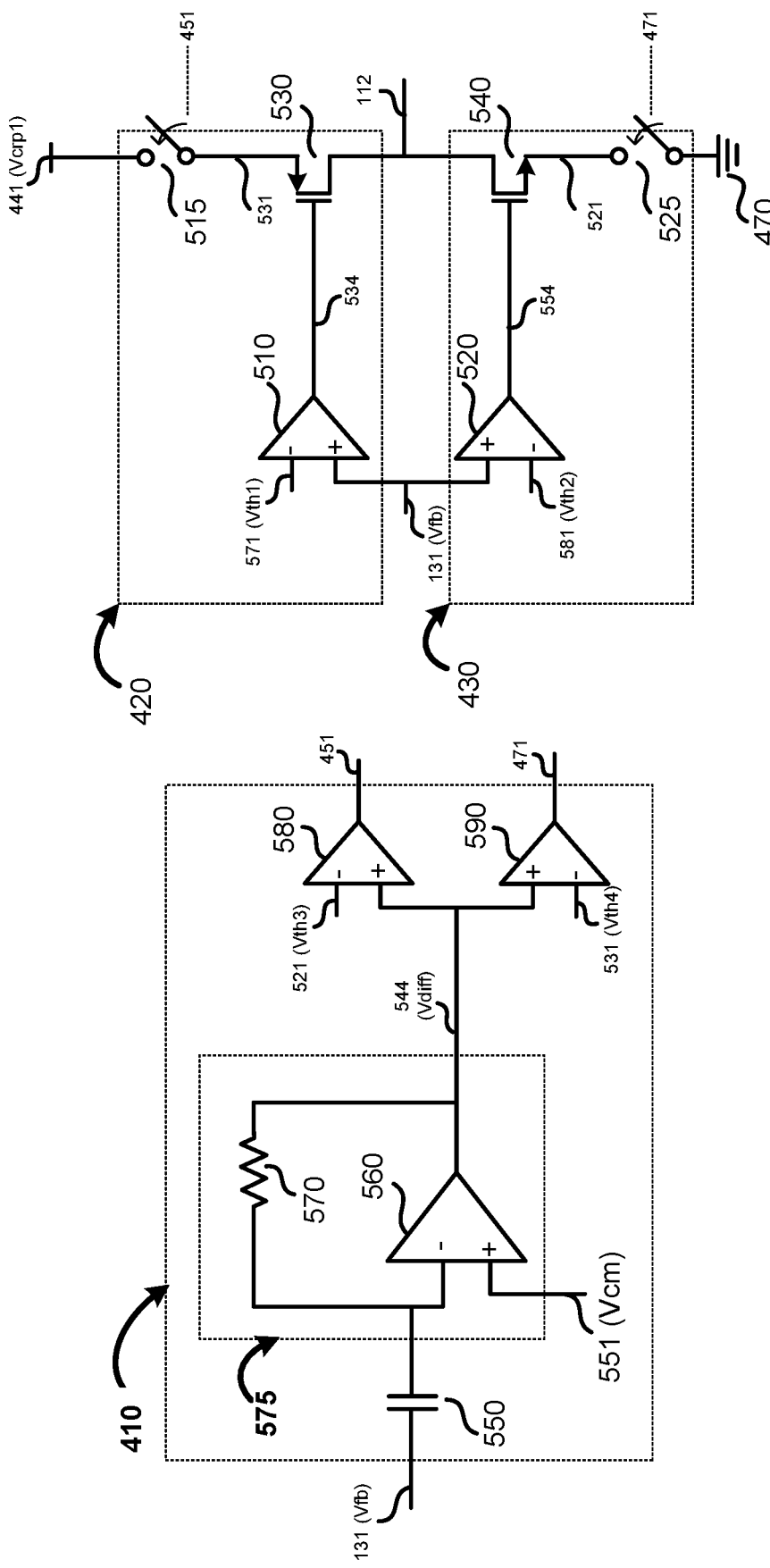
FIGS. 5A and 5B are circuit diagrams illustrating the implementation details of a voltage regulator in an embodiment of the present disclosure.

FIG. 5A is a circuit diagram illustrating the implementation details of transient response control circuit 410 in an embodiment of the present disclosure. Transient response control circuit 410 is shown containing comparators 580 and 590, and differentiator circuit (575) containing capacitor 550, op-amp 560 and resistor 570. Transient response control circuit 410 receives feedback voltage Vfb 131 and generates disable signals 451 and 471. Common-mode voltage 551 (Vcm) is an internally generated voltage that is used to maintain Vdiff 544 at a level midway between the power supply and ground terminals of comparators 580 and 590, which may respectively be Vcrp1 and 470. Vth3 and Vth4 are respectively greater than and less than Vcm by a corresponding magnitude. In an embodiment, Vcm equals Vref, and Vth3 and Vth4 respectively equal Vth2 and Vth1.

Differentiator circuit 575 generates voltage 544 (Vdiff) with a magnitude that is proportional to the rate of change of Vfb with respect to time, with the magnitude being dependent on the values of resistor 570 and capacitor 550. Since Vfb is a scaled-down fraction of Vout as noted above, Vdiff is also proportional to the rate of change of Vout. Output voltage Vdiff is connected to comparator 580 and comparator 590.

Comparator 580 receives voltage Vdiff on the positive terminal and a threshold voltage 521 (Vth3) on the negative terminal. When Vdiff is greater than Vth3 521, comparator 580 generates a logic 1 on path 451. When Vdiff is less than Vth3 521, comparator 580 generates a logic 0 on path 451.

Comparator 590 receives voltage Vdiff on the negative terminal and a threshold voltage 531 (Vth4) on the positive terminal. When Vdiff is less than Vth4 531, comparator 590 generates a logic 0 on path 471. When Vdiff is greater than Vth4 531, comparator 590 generates a logic 1 on path 471.

Each of comparators 580 and 590 is powered by a supply source (e.g., charge pump) other than the one providing Vcp (141), and thus may be Vcrp1 (441) itself. The manner in which transient response control circuit 410 operates to disable slew-up circuit 420 and slew-down circuit 430 at appropriate times is described next, with respect to FIG. 5B.

FIG. 5B illustrates the details of a slew-up and a slew-down circuit according to the present disclosure. Components 510 and 530 of slew-up circuit 420 respectively correspond to the components 265, 275 of slew-up circuit 280 of FIG. 2B and their description is not repeated here in the interest of conciseness. Additionally, slew-up circuit 420 contains a switch 515, which is controlled to be open or closed by signal 451. Components 520 and 540 of slew-down circuit 430 respectively correspond to components 285 and 295 of slew-down circuit 290, and their description is not repeated here in the interest of conciseness. Additionally, slew-down circuit 430 contains a switch 525, which is controlled to be open or closed by signal 471.

Switch 515 is shown connected between voltage 441 (Vcrp1) and the source terminal of PMOS transistor 530. Switch 525 is shown connected between the drain terminal of NMOS transistor 540 and ground 470.

When the rate of change of Vout/Vfb is less than a predetermined rate (which is determined by the values of capacitor 550 and resistor 570), Vdiff either equals Vcm or is a positive or negative pulse (with respect to Vcm), the magnitude of which does not exceed Vth3 and Vth4 respectively. Correspondingly, signals 451 and 471 are respectively at logic 0 and logic 1, thereby maintaining switches 515 and 525 closed. When the slope (rate of change) of Vout/Vfb exceeds the predetermined value, Vdiff is a positive or negative pulse (with respect to Vcm), the magnitude of which exceeds Vth3 or Vth4 respectively. Specifically, when Vout/Vfb changes from a negative value to a positive value at a rate of change greater than the predetermined value, Vdiff pulses above Vth3 for a corresponding duration, and comparator 580 generates a logic 1 on path 451 for the corresponding duration causing switch 515 to be opened also for the corresponding duration. Thus, slew-up circuit 420 is disabled for the corresponding duration. Similarly, when Vout/Vfb changes from a positive value to a negative value at a rate greater than the predetermined rate, Vdiff pulses below Vth4 for a corresponding duration, and comparator 590 generates a logic 0 on path 471 for the corresponding duration, causing switch 525 to be opened also for the corresponding duration. Thus, slew-down circuit 430 is disabled for the corresponding duration.

The manner in which transient response control circuit 410 operates to improve the transient response of a voltage regulator by disabling the slew-up and slew-down circuits at respective appropriate times as noted above is illustrated next with respect to FIG. 6.

4. Disabling Slew-Up and Slew-Down Circuits

Figure 6:
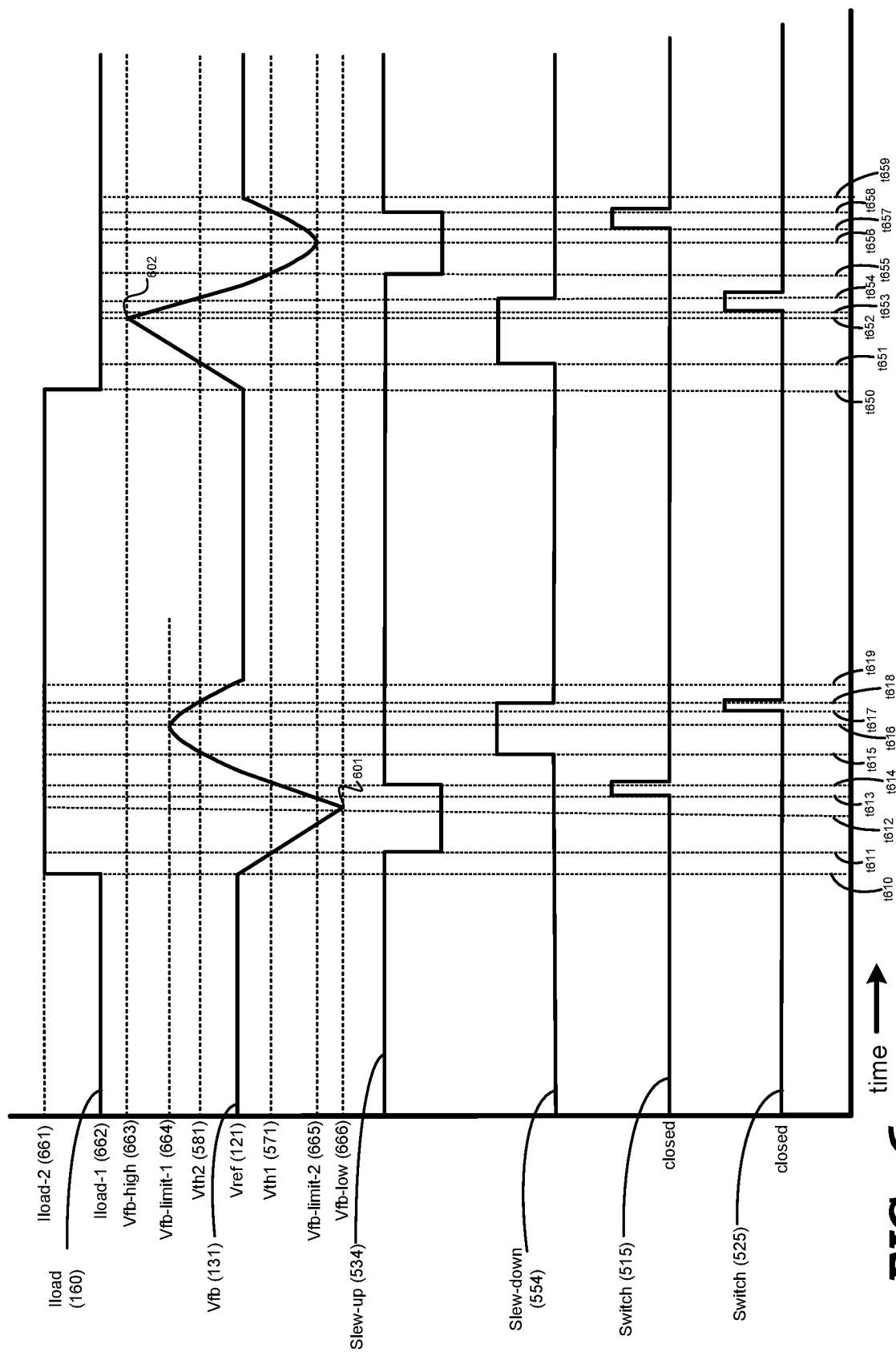
FIG. 6 is a timing diagram illustrating waveforms at various nodes of a voltage regulator, in an embodiment of the present disclosure.

FIG. 6 is a timing diagram (not to scale) illustrating the response of circuits shown in FIGS. 5A-5B, in an embodiment of the present disclosure. FIG. 6 shows example waveforms of Iload 160, Vfbat node 131 (both of FIG. 4), slew-up signal 534, slew-down signal 554, and states of switches 515 and 525 (all of FIG. 5B). Since Vfb is a scaled-down fraction of Vout, the shape of waveform Vfb corresponds to that of Vout but in a smaller magnitude.

It may be appreciated that the specific shape of Vout/Vfb shown in FIG. 6 would depend on several factors such as the effect of gate capacitance of power NMOS 120, the capacitance value of output capacitor 150, effect of main feedback loop, and effect of slew-up circuit 420, slew-down circuit 430 and transient response control circuit 410. However, in the description of FIG. 6, for the sake of simplicity, it is assumed that the effect on Vfb is due to the combination of slew-up circuit 420, slew-down circuit 430 and transient response control circuit 410 alone.

Further, although the change in Iload is shown as a step change, the rise/fall in Iload typically occurs in a non-zero time interval. For example, voltage regulator 400 may be designed to support a maximum rate of change of 1 A/1 μs of Iload. The transient response period depicted in the time interval t610-t619 may be substantially equal to or slightly larger than 1 μs. Therefore, FIG. 6 depicts only one change in Iload in the interval t610-t619, and the corresponding response. In other words, Iload would typically not change again by t619.

Voltage regulator 400 is in steady-state until time t610. Thus, Vfb is substantially equal to Vref, slew-up signal 534 is at logic 1, slew-down signal 554 is at logic 0, and switches 515 and 525 are closed. At t610, Iload has a step increase from its current value Iload-1 to value Iload-2. As a result, Vfb begins to fall below Vref (undershoot).

At t611, when Vfb falls below Vth1, signal 534 goes to logic 0, thus switching ON PMOS transistor 530 of slew-up circuit 420 (see FIG. 5B). Slew-up current 531 (of a first magnitude (slew-up-FS)) flows from Vcrp1 into node 112. Slew-up-FS represents the "full-strength" magnitude of slew-up current generated by slew-up circuit 420 in response to the occurrence of undershoot condition at t610 (signal 534 goes to logic 0). Signal 534 continues to be at logic 0 during the time interval t611-t614 (until Vfb rises above Vth1). At t612, power NMOS 120 current equals the load current Iload-2, and Vfb reaches the valley point 601 (Vfb-low). Thus, the slope of Vfb is negative in the time interval t610-t612.

At t612, Vfb begins to rise as power NMOS 120 is able to meet the load demand (current through NMOS 120 equals Iload-2). As a result the slope of Vfb changes from negative value to positive value at t612 and begins rising. The change in slope at t612 exceeds the predetermined rate (noted above) and a positive pulse (not shown) is generated on path 544 (Vdiff) at t613, which is assumed to occur slightly later than t612. Consequently, disable signal 451 changes to logic 1 causing switch 515 to open at t613, thus disabling slew-up circuit 420. Switch 515 closes after a brief time interval. Thus, slew-up circuit 420 is disabled at (or slightly later than) the change in slope. Transient response control circuit 410 is designed in such a way that switch 515 remains open at least until signal 534 returns to logic 1.

At t614, Vfb rises above Vth1 and signal 534 returns to logic 1. Switch 515 closes shortly thereafter. Subsequently Vfb exceeds Vref (overshoot), and continues to rise and exceeds Vth2 at t615 due to overcorrection as noted above. At t615, when Vfb exceeds Vth2, signal 554 goes to logic 1, thus switching ON NMOS transistor 540 of slew-down circuit 430 (see FIG. 5B). Signal 554 continues to be at logic 1 during the time interval t615-t617 (until Vfb falls below Vth2). Vfb continues to rise until it reaches an upper limit (Vfb-limit-1) at t616 and then begins to fall starting at t616. Thus, the slope of Vfb is positive in the time interval t612-t616.

At t616, the slope of Vfb changes from positive value to negative value. The change in slope at t616 exceeds the predetermined rate (noted above) and a negative pulse (not shown) is generated on path 544 (Vdiff) at t617, which is assumed to occur slightly later than t616. Consequently, disable signal 471 changes to logic 0, causing switch 525 to open at t617 thus disabling slew-down circuit 430. Switch 525 closes after a brief time interval. Thus, slew-down circuit 430 is disabled at (or slightly later than) the change in slope. As noted above with respect to the state of switch 515, the design of transient response control circuit 410 is designed in such a way that switch 525 remains open until signal 554 returns to logic 0.

At t618, Vfb falls below Vth2 and signal 554 goes to logic 0. Switch 525 closes shortly thereafter. Vfb reaches steady-state value of Vref at t619. The magnitude of overshoot (Vfb-limit-1 minus Vref) is smaller compared to the corresponding magnitude of overshoot (Vos1 minus Vref) of FIG. 3. Thus, by disabling slew-up circuit at the appropriate time, voltage regulator 400 minimizes the overshoot (at t616) due to overcorrection subsequent to the occurrence of an undershoot (at t610). However, although not shown in FIG. 6, one or more undershoot(s) and corresponding overshoot(s) due to overcorrection may still occur after t619.

Referring to FIG. 6, voltage regulator 400 is in steady-state between time interval t619-t650. Thus, Vfb is substantially equal to Vref, slew-up signal 534 is at logic 1, slew-down signal 554 is at logic 0, and switches 515 and 525 are closed. At t650, Iload has a step decrease from its current value Iload-2 to value Iload-1. As a result, Vfb begins to rise above Vref (overshoot).

At t651, when Vfb rises above Vth2, signal 554 goes to logic 1, thus switching ON NMOS transistor 540 of slew-down circuit 430 (see FIG. 5B). Slew-down current 521 (of a second magnitude (slew-down-FS)) flows from node 112 into ground, thereby quickly discharging the gate capacitance of pass-transistor 120. Slew-down-FS represents the "full-strength" magnitude of slew-down current generated by slew-down circuit 430 in response to the occurrence of overshoot condition at t650. Signal 554 remains at logic 1 during the time interval t651-t654 (until Vfb falls below Vth2). At t652, Vfb reaches the peak point 602 (Vfb-high). Thus, the slope of Vfb is positive in the time interval t650-t652.

At t652, current through pass-transistor equals Iload-1, and Vfb begins to fall. As a result, the slope of Vfb changes from positive value to negative value at t652 and continues to fall. The change in slope at t652 exceeds the predetermined rate (noted above) and a negative pulse (not shown) is generated on path 544 (Vdiff) at t653, which is assumed to occur slightly later than t652. Consequently, disable signal 471 changes to logic 0, causing switch 525 to open at t653, thus disabling slew-down circuit 430. Switch 525 closes after a brief time interval. Thus, slew-down circuit 430 is disabled at (or slightly later than) the change in slope. Transient response control circuit 410 is designed in such a way that switch 525 remains open until signal 554 returns to logic 0.

At t654, Vfb falls below Vth2 and signal 554 returns to logic 0. Switch 525 closes shortly thereafter. Vfb falls below Vref (undershoot) sometime between t654 and t655. At t655, Vfb falls below Vth1 due to overcorrection as noted above. At t655, when Vfb falls below Vth1, signal 534 goes to logic 0, thus switching ON PMOS transistor 530 of slew-up circuit 420 (see FIG. 5B). Signal 534 continues to be at logic 0 during the time interval t655-t657 (until Vfb rises above Vth1). Vfb continues to fall until it reaches a lower limit (Vfb-limit-2) at t656 and then begins to rise starting at t656. Thus, the slope of Vfb is negative in the time interval t652-t656.

At t656, the slope of Vfb changes from negative value to positive value. The change in slope at t656 exceeds the predetermined rate (noted above) and a positive pulse (not shown) is generated on path 544 (Vdiff) at t657, which is assumed to occur slightly later than t656. Consequently, disable signal 451 changes to logic 1, causing switch 515 to open at t657 thus disabling slew-up circuit 420. Switch 515 closes after a brief time interval. Thus, slew-up circuit 420 is disabled at (or slightly later than) the change in slope.

At t658, Vfb rises above Vth1 and signal 534 goes to logic 1. Switch 515 closes shortly thereafter. Vfb is shown as reaching steady-state value of Vref at t659. The magnitude of undershoot (Vref minus Vfb-limit-2) is smaller compared to the corresponding magnitude of undershoot (Vref minus Vus1) of FIG. 3. Thus, by disabling slew-down circuit at the appropriate time, voltage regulator 400 minimizes the undershoot (at t656) due to overcorrection subsequent to occurrence of an overshoot (at t650). However, although not shown in FIG. 6, one or more overshoot(s) and undershoot(s) due to overcorrection may still occur after t659.

Although transient response control circuit 410 minimizes overcorrection it may not completely eliminate, and the transient response of voltage regulator 400 may still continue to exhibit an oscillatory nature although the peak-to-peak magnitude of such oscillations may be smaller than that shown in FIG. 3. This could occur due to the slew-up and slew-down paths triggering each other despite the reduction in magnitude of overcorrection.

According to another aspect of the present disclosure, the slew-up and slew-down circuits are prevented from triggering each other, in order to further improve the transient response of a voltage regulator. An example technique to achieve this objective is described in detail with respect to FIGS. 7A and 7B.

5. Preventing Slew-Up and Slew-Down Circuits from Triggering Each Other

As described above with respect to FIG. 6, slew-up circuit 420 may be enabled either due to undershoot conditions triggered by changes in Iload (load transients), or undershoot conditions triggered as a result of overcorrection by slew-down circuit 430. Similarly, slew-down circuit 430 may be enabled due to overshoot conditions triggered by changes in Iload (load transients) or overshoot conditions triggered as a result of overcorrection by slew-up circuit 420.

Upon getting enabled in response to undershoot/overshoot conditions triggered by load transients, it is desirable that slew-up and slew-down circuits generate slew-up (531) and slew-down (521) currents with as great strengths as possible ("full-strength magnitudes" slew-up-FS and slew-down-FS) in order to quickly correct the output voltage. However, upon getting enabled as a result of overcorrection, it is desirable that slew-up and slew-down circuits generate slew-up (531) and slew-down (521) currents with lower magnitudes in order to potentially prevent the circuits from triggering each other. In other words, it may be necessary to ensure that when the slew-up circuit is enabled coming out of steady-state, the slew-down current strength is reduced for a predetermined duration. Similarly, it may be necessary to ensure that when the slew-down circuit is enabled coming out of steady-state, the slew-up current strength is reduced for a predetermined duration.

Figure 7A:
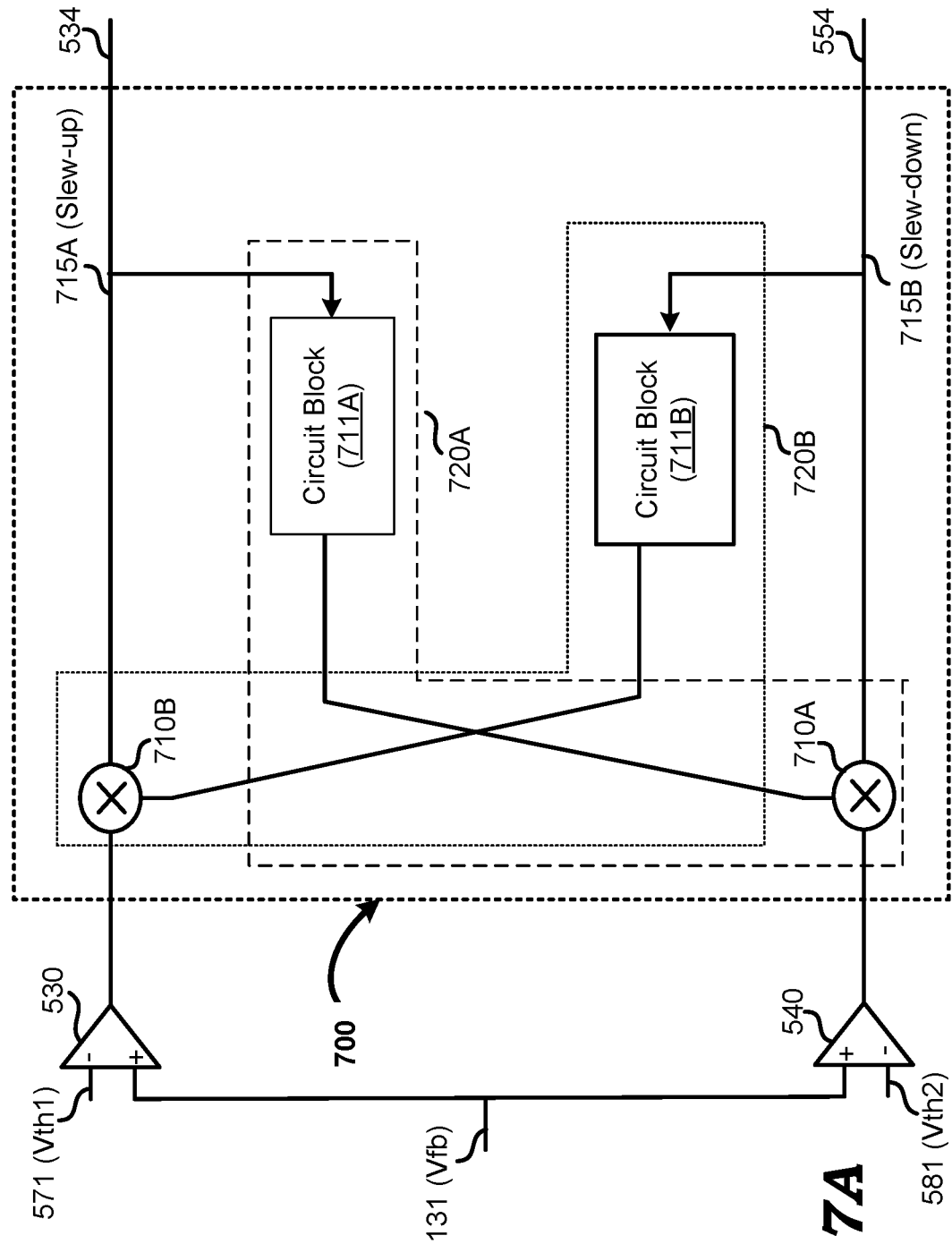
FIG. 7A is a block diagram illustrating a technique to prevent slew-up and slew-down circuits from triggering each other, in an embodiment of the present disclosure.

FIG. 7A is a block diagram illustrating a technique to prevent slew-up and slew-down circuits from triggering each other, in an embodiment of the present disclosure. Scaling block 700 is inserted between the comparators and transistors of FIG. 5B. Scaling block 700 in combination with the components/blocks of FIG. 5B represents modified slew-up and slew-down circuits. Comparators 530 and 540 of FIG. 5B are also shown in FIG. 7A. Scaling block 700 is shown containing slew-down-scaling circuit 720A and slew-up-scaling circuit 720B.

Slew-downscaling circuit 720A is shown containing multiplier 710A and circuit block 711A. Slew-down scaling circuit 720A operates to reduce the strength of slew-down current 521 upon slew-up circuit 420 being enabled in response to an undershoot in Vout due to Iload. When slew-up current 531 is ON, circuit block 711A sets the multiplication factor of multiplier 710A to a value less than 1 (for example, 0.25). When slew-up current 531 is OFF, circuit block 711A sets the multiplication factor of multiplier 710A to 1. As a result, the gate drive to transistor 540 is reduced in response to triggering of slew-up circuit, thereby weakening the pull-down current if slew-down circuit is triggered due to overcorrection.

Slew-up scaling circuit 720B is shown containing multiplier 710B and circuit block 711B. Slew-up scaling circuit 720B operates to reduce the strength of slew-up current 531 upon slew-down circuit 430 being enabled in response to an overshoot in Vout due to Iload. When slew-down current 521 is ON, circuit block 711B sets the multiplication factor of multiplier 710B to a value less than 1 (for example, 0.25). When slew-down current 521 is OFF, circuit block 711B sets the multiplication factor of multiplier 710B to 1. As a result, the gate drive to transistor 530 is reduced in response to triggering of slew-down circuit, thereby weakening the pull-up current if slew-up circuit is triggered due to overcorrection.

Figure 7B:
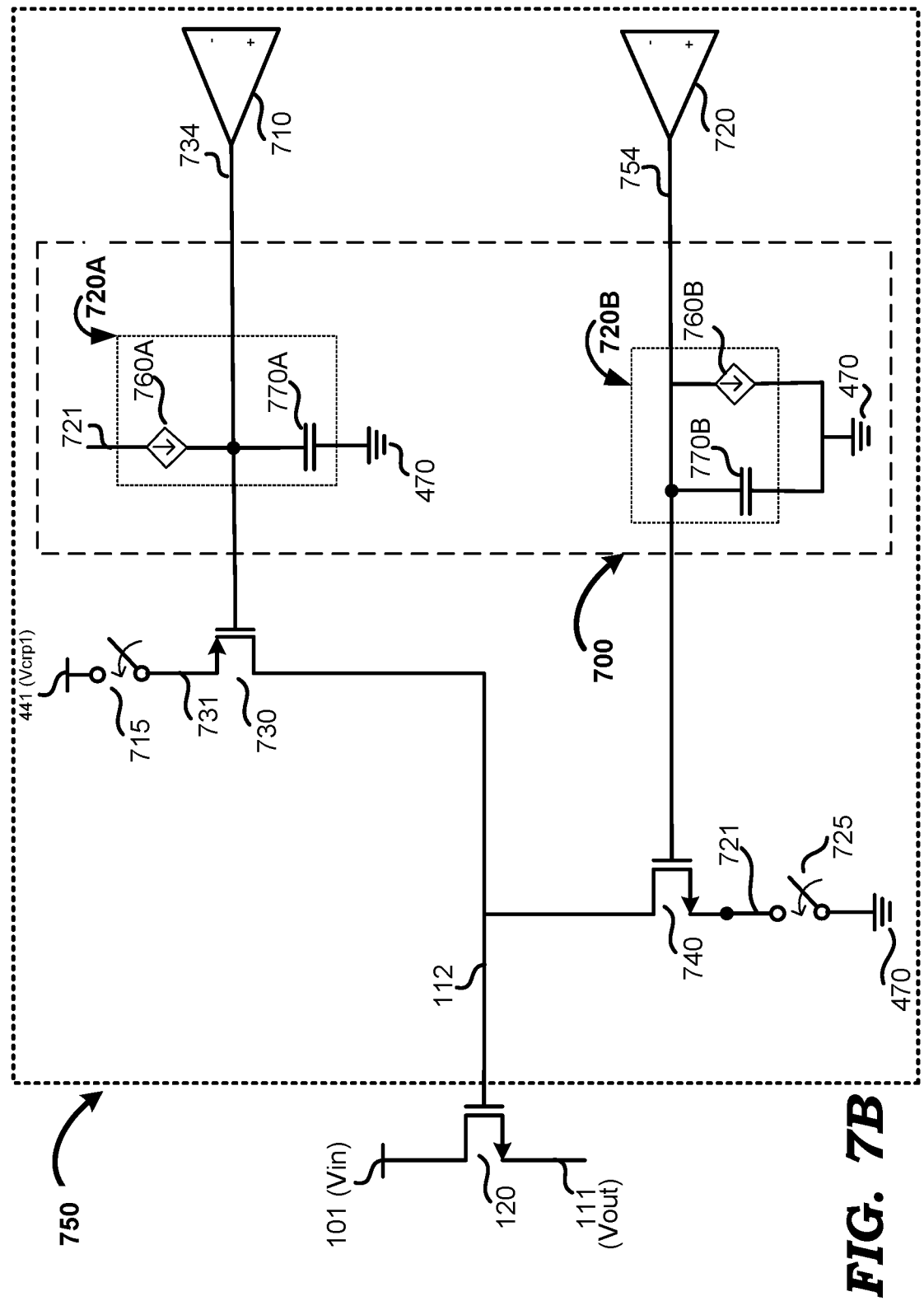
FIG. 7B is a circuit diagram illustrating the implementation details of some of the blocks shown in FIG. 7A, in an embodiment of the present disclosure.

FIG. 7B is a circuit diagram illustrating an example implementation of scaling block 700 of FIG. 7A, in an embodiment of the present disclosure. Additionally, the other components of modified slew-up and slew-down circuits are also shown in FIG. 7B.

Slew-up scaling circuit 720A is shown containing current-controlled current source 760A and capacitor 770A. Current-controlled current source 760A is connected between Vcrp1 and gate terminal of PMOS transistor 730. Capacitor 770A is connected between gate terminal of PMOS transistor 730 and ground. Magnitude of current in current-controlled current source 760A is controlled by slew-down current 721 through NMOS transistor 740. In particular, when slew-down current 721 is ON (and at full-strength), current-controlled current source 760A is ON for the predetermined duration. When slew-down current 721 is OFF, current-controlled current source 760A is OFF.

Slew-down scaling circuit 720B is shown containing current-controlled current source 760B and capacitor 770B. Each of current-controlled current source 760B and capacitor 770B is connected between gate terminal of NMOS transistor 740 and ground. Magnitude of current in current-controlled current source 760B is controlled by slew-up current 731 through PMOS transistor 730. In particular, when slew-up current 731 is ON (and at full-strength), current-controlled current source 760B is ON for the predetermined duration. When slew-up current 731 is OFF, current-controlled current source 760B is OFF.

The operation of the modified slew-up and slew-down circuits is illustrated next with reference to FIG. 8.

6. Operation of Modified Slew-Up and Slew-Down Circuits

Figure 8:
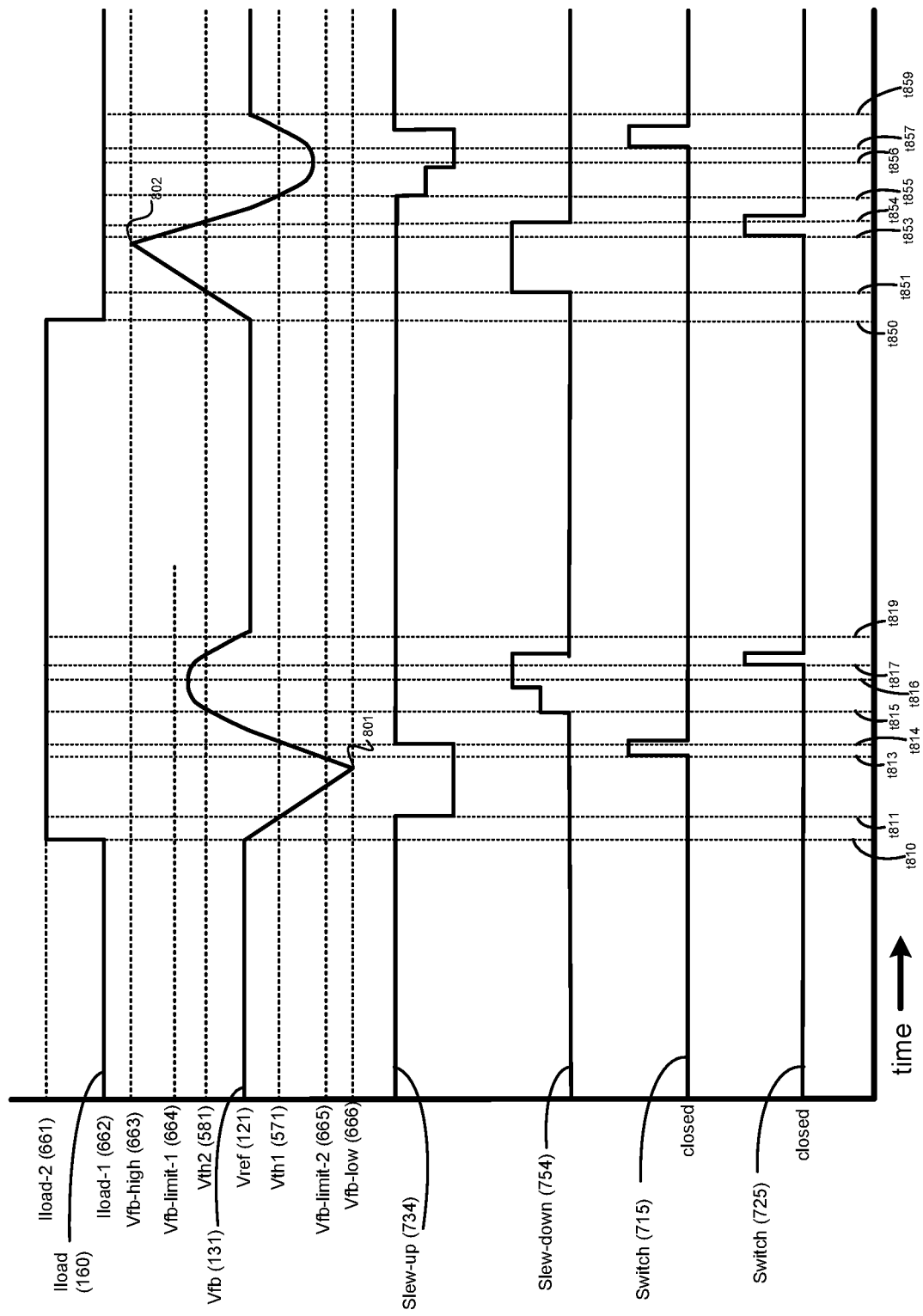
FIG. 8 is a timing diagram illustrating waveforms at various nodes of a voltage regulator, in an embodiment of the present disclosure.

FIG. 8 is a timing diagram (not to scale) illustrating waveforms at various nodes of a voltage regulator, in an embodiment of the present disclosure. The signals of FIG. 8 are the same as those of FIG. 6. Also, only the differences from the waveforms of FIG. 6 are described in the interest of brevity.

A. Operation of Slew-Up Scaling Circuit
i. Steady-State Conditions

Referring to FIG. 8, under steady-state conditions (prior to t810, between t819 and t850 and post-t859), signal 734 is at logic 1, gate terminal of PMOS transistor 730 is at logic high, switch 715 is closed, no current flows through current-controlled current source 760A (open circuit) and capacitor 770A is in a discharged state.

ii. Undershoot Condition Triggered by Load Transients

At t810, an undershoot condition occurs due to load transient. At t811, signal 734 goes to logic 0, pulling down gate terminal of PMOS transistor 730 to ground. PMOS transistor 730 is switched ON and current 731 with "full-strength magnitude" (slew-up-FS) flows through PMOS transistor 730. Current-controlled current source 760A is an open circuit since NMOS transistor 740 is not ON. Capacitor 770A continues to be in the discharged state.

At t813, slew-up circuit 420 is disabled by opening switch 715 (in response to signal 451). Current 731 ceases to flow. At t814, signal 734 returns to logic 1 as Vfb rises above Vth1. Thus, it may be appreciated that the operation of the slew-up circuit is unaltered by the addition of scaling block 700 when the slew-up circuit is enabled in response to undershoot conditions triggered by load transients.

iii. Undershoot Condition Triggered by Overcorrection by Slew-Down Circuit

An overshoot condition is triggered by load transient at t850. At t851, NMOS transistor 740 is switched ON and current 721 flows at full strength, which in turn, switches-ON current-controlled current source 760A. Capacitor 770A begins to charge towards Vcrp1 at a speed determined by the strength of current 721. Therefore, when comparator 710 attempts to drive node 734 to ground, block 720A would prevent node 734 from being pulled all the way to ground. Instead, node 734 would be at a voltage between ground and Vcrp1, thereby driving gate of PMOS transistor 730 with a weaker voltage than otherwise. The combination of components 710 and 720A operates as a weak gate drive for the predetermined duration noted above.

At t855, due to overcorrection by the slew-down circuit, PMOS transistor 730 is a weak pull-up, and current 731 flows through PMOS transistor 730 with a magnitude less than the "full-strength magnitude" (slew-up-FS). The weak pull-up results in excursion(s) of node Vfb below Vth1 to be reduced in magnitude than if block 720A were not present, thereby reducing the probability of triggering of slew-down circuit. In FIG. 8, the operation of block 720A is shown as resulting in no further triggering of slew-down circuit, and Vfb is shown as reaching steady-state at t859. However, it is noted here that in general, the operation of block 720A may be such as to reduce the number of (rather than completely eliminating) further triggering of slew-down circuit by the slew-up circuit.

It may be observed from FIG. 8 that the magnitude of undershoot (at t856) following the overshoot (at t850) is less than the magnitude of undershoot (Vfb-limit-2, 665) depicted in FIG. 6 (at t656). This is due to the reduced strength of slew-up current as noted above.

B. Operation of Slew-Down Scaling Circuit i. Steady-State Conditions

Referring to FIG. 8, under steady-state conditions (prior to t810, between t819 and t850 and post-t859), signal 754 is at logic 0, gate terminal of NMOS transistor 740 is at logic low, switch 725 is closed, no current flows through current-controlled current source 760B (open circuit) and capacitor 770B is discharged.

ii. Overshoot Condition Triggered Directly by Load Transients

At t850, an overshoot condition occurs due to load transient. At t851, signal 754 goes to logic 1, NMOS transistor 740 is switched ON and current 721 flows through NMOS transistor 740 with "full-strength magnitude" (slew-down-FS). Current-controlled current source 760B is an open circuit since PMOS transistor 730 is not ON and capacitor 770B does not hold any charge.

At t853, slew-down circuit 430 is disabled by opening switch 725 (in response to signal 451). Current 721 ceases to flow. At t854, signal 754 returns to logic 0 as Vfb falls below Vth2. Thus, it may be appreciated that the operation of the slew-down circuit is unaltered by the addition of scaling block 700 when the slew-down circuit is enabled in response to overshoot conditions directly triggered by load transients.

iii. Overshoot Condition Triggered by Over Correction by Slew-Up Circuit

An undershoot condition is triggered by load transient at t810. At t811, PMOS transistor 730 is switched ON and current 731 flows at full strength, which in turn, switches-ON current-controlled current source 760B. Capacitor 770B discharges to zero volts. When comparator 720 attempts to drive node 754 to Vcrp1, block 720B would prevent node 754 from being pulled all the way to Vcrp1. Instead, node 754 would be at a voltage between ground and Vcrp1, thereby driving gate of NMOS transistor 740 with a weaker voltage than otherwise. The combination of components 720 and 720B operates as a weak gate drive for the predetermined duration noted above.

At t815, due to overcorrection by the slew-up circuit, NMOS transistor 740 is a weak pull-down, and current 721 flows through NMOS transistor 740 with a magnitude less than the "full-strength magnitude" (slew-down-FS). The weak pull-down results in excursion(s) of node Vfb above Vth2 to be reduced in magnitude than if block 720B were not present, thereby reducing the probability of triggering of slew-up circuit. In FIG. 8, the operation of block 720B is shown as resulting in no further triggering of slew-up circuit, and Vfb is shown as reaching steady-state at t819. However, it is noted here that in general, the operation of block 720B may be such as to reduce the number of (rather than completely eliminating) further triggering of slew-up circuit by the slew-down circuit.

It may be observed from FIG. 8 that the magnitude of overshoot (at t816) following the undershoot (starting at t810) is less than the magnitude of overshoot (Vfb-limit-1, 664) depicted in FIG. 6 (at t616). This is due to the reduced strength of slew-down current as noted above.

Further, although the description herein is provided in the context of LDO, several aspects of the present disclosure can be equally well applied in other types of voltage regulators such as switching voltage regulators, and would be obvious to one skilled in the relevant arts upon reading the disclosure herein. Also, although several discrete voltages have been illustrated in embodiments of the present disclosure, one or more of these could be of the same value.

Aspects of the present disclosure enable a voltage regulator to regulate output voltage while exhibiting an improved transient response. Voltage regulator 400 implemented as described above can be incorporated in a larger device or system as described briefly next.

7. System

Figure 9:
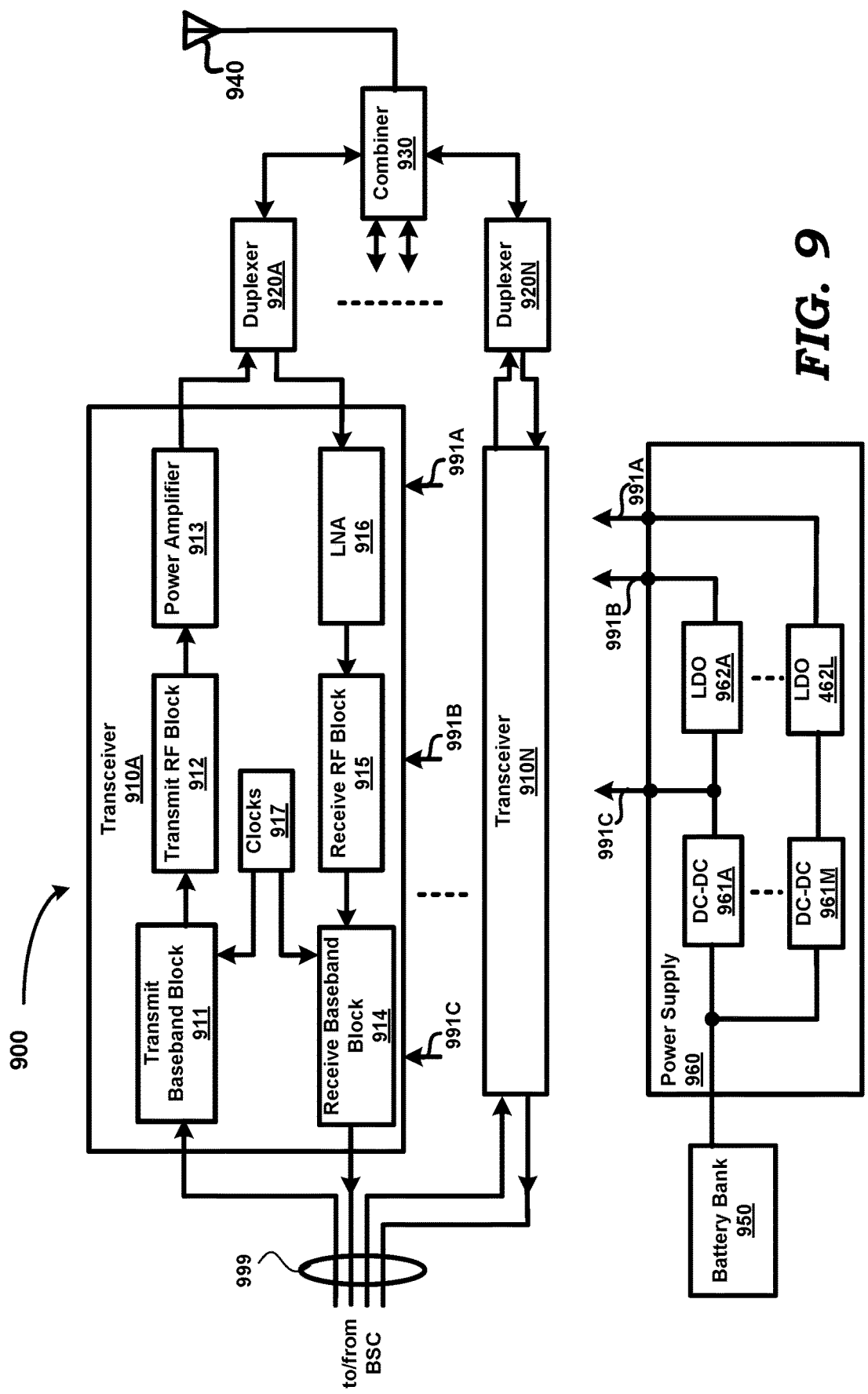
FIG. 9 is a block diagram of a system in which a device implemented according to several aspects of the present disclosure can be incorporated, in an embodiment of the present disclosure.

FIG. 9 is a block diagram illustrating the implementation details of a system incorporating linear voltage regulator 400 described in detail above, in an embodiment of the present disclosure. The system of FIG. 9 may be deployed in a Base Transceiver Station (BTS) (eNodeB in LTE-Long Term Evolution) of a cellular telephony system, and is referred to herein as BTS system 900. Broadly, BTS system 900 facilitates wireless communication between user equipment (UE) that may be mobile stations (e.g., cell phones) or fixed user equipment such as computers with internet connectivity.

BTS system 900 may be implemented consistent with technologies and standards such as GSM, CDMA, 3G, 4G, LTE, 5G, etc. BTS system 900 is shown containing transceivers 910A through 910N, duplexers 920A through 920N, combiner 930, antenna 940, battery pack 950 and power supply 960. The specific components/blocks of BTS system 900 are shown merely by way of illustration. However, typically BTS system 900 may contain more components/blocks, such as temperature sensors, maintenance and configuration blocks, etc., as is well known in the relevant arts.

Each of transceivers 910A through 910N operates to transmit and receive communication signals to/from wireless user equipment via the corresponding duplexer 920A-920N, combiner 930 and antenna 940. Each of the transceivers contains a transmitter portion and a receiver portion. Thus, transceiver 910A is shown containing a transmitter portion that includes transmit baseband block 911, transmit RF block 912 and power amplifier 913, and a receiver portion that includes low-noise amplifier (LNA) 916, receive RF block 915 and receive baseband block 914.

Transmit baseband block 911 receives information signals (e.g., representing voice, data) from a base station controller (BSC) (which in turn receives the communication signals from another user equipment (wireless or fixed) in the network downstream of the BSC) via the corresponding path shown in bus 999, processes the signals according to the corresponding technology and protocols to perform modulation, channel coding and other operations, and forwards the processed signals to transmit RF block 912. Transmit RF block 912 may perform operations such as up-conversion to RF (Radio Frequency), and forwards the RF signals to power amplifier 913. Power amplifier 913 amplifies the received RF signals and transmits the power-amplified signals via duplexer 920A, combiner 930 and antenna 940 to corresponding wireless user equipment.

LNA 916 receives an RF signal from a wireless user equipment via duplexer 920A, combiner 930 and antenna 940, amplifies the RF signal, and forwards the amplified RF signal to receive RF block 915. Receive RF block 915 down-converts the RF signal to baseband frequency and forwards the baseband signal to receive baseband block 914. Receive baseband block 914 may perform operations such as demodulation, error correction, etc., on the baseband signals to obtain the information signal (e.g., data, voice) and forwards the information signal to BSC via the corresponding path in bus 999.

Clocks 917 generates one or more clocks required to enable operation of digital units in transceiver 910. For example, transmit baseband block 911 and receive baseband block 914 may internally contain one or more processors that require clocks to enable their operation.

The transmitters, receivers and clocks of the other transceivers of FIG. 9 operate similarly as noted above with respect to transceiver 910A, and contain corresponding transmitter and receiver blocks.

Each of duplexers 920A through 920N enables transmission and reception of the respective transmitted and received signal (i.e., bi-directional (duplex) communication) over the single path between the corresponding duplexer and combiner 930. Each of duplexers 920A through 920N may be implemented with two band-pass filters connected in parallel, with one filter providing a path between the corresponding transmitter and combiner 930, and the other filter providing a path between combiner 930 and the corresponding receiver.

Combiner 930 combines the signals from/to the transceivers 910A through 910N to enable transmission and reception of all the signals using a single antenna 940.

Antenna 940 operates to receive from, and transmit to, a wireless medium, information-bearing wireless signals between the transceivers and wireless user equipment.

Battery bank 950 houses batteries to provide a power source for the operation of the blocks/units in BTS system 900.

Power supply 960 receives power (for example with voltage 12 volts (V)) from battery bank 950, and contains multiple DC-DC converters 961A through 961M, as well as multiple linear voltage regulators (implemented for example as LDOs) 962A through 962L. DC-DC converters 961A-961M generate various voltages (with each DC-DC converter generating a corresponding voltage such as for example 0.7V, 1.2V, 2.0V, 3.6V, etc.) for powering one or more blocks/components of BTS system 900 described above. Specifically, the voltages generated by the DC-DC converters may be used to power blocks and components in transceivers 910A through 910N that are less sensitive to noise, such as for example the transmit and receive baseband blocks. Thus, supply voltage 991C is shown as being generated by DC-DC converter 961A, and being provided to (the transmit and receive baseband blocks) of transceiver 910. In the interest of clarity and conciseness, only one supply connection directly from a DC-DC converter is shown in FIG. 9. However, there would be many more such supply connections.

Each of LDOs 962A-962L is connected to receive the output voltage of a corresponding DC-DC converter 961A-961M), and generates a corresponding lower voltage as needed for some components/blocks of the transceivers. The voltages generated by the LDOs are used to power noise-sensitive blocks and components in transceivers 910A through 910N, such as for example transmit RF blocks (such as 912), receive RF blocks (such as 915), LNAs (such as 916) and the clocks (such as 917) contained in the transceivers. In the interest of clarity and conciseness, only two supply connections 991A and 991B (from LDO 962A and LDO 962L respectively) are shown in FIG. 9. However, there would be many more such supply connections from the LDOs to corresponding blocks in the transceivers. The LDOs may have better load and line regulation as compared to the DC-DC converters, and may thus provide cleaner supply voltages with lesser noise, as required by the noise-sensitive blocks noted above.

One or more of LDOs 962A-962-L is/are implemented as linear voltage regulator 400 described in detail above.

It is noted here that linear voltage regulator 400 can also be used in other systems, such as, for example, individual transmitters and receivers, mobile phones, etc.

8. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 4, 5A, 5B, 7A, 7B and 9, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors will be apparent to one skilled in the relevant arts by reading the disclosure provided herein. For example, the NMOS transistors may be replaced with PMOS (P-type MOS) transistors, while also interchanging the connections to power and ground terminals.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A voltage regulator to generate a regulated output voltage from an input voltage, said voltage regulator comprising:
    a slew-up circuit designed to couple a first node of said voltage regulator to a first constant reference potential upon occurrence of a first condition of said regulated output voltage, wherein said first condition comprises an undershoot of said regulated output voltage to a level less than a first threshold voltage;
    a slew-down circuit designed to couple said first node to a second constant reference potential upon occurrence of a second condition of said regulated output voltage, wherein said second condition comprises an overshoot of said regulated output voltage to a level greater than a second threshold voltage;
    a transient response control circuit designed to disable said slew-up circuit upon a rate of change of said regulated output voltage with respect to time, changing from a negative value to a positive value subsequent to occurrence of said first condition, said rate of change representing a slope of said regulated output voltage when plotted against time, wherein a magnitude of said rate of change exceeds a predetermined rate,
    said transient response control circuit designed to disable said slew-down circuit upon said rate of change changing from a positive value to a negative value subsequent to occurrence of said second condition,
    wherein said transient response control circuit comprises:
        a differentiator coupled to receive said regulated output voltage, said differentiator designed to generate a first output signal with a magnitude proportional to said rate of change of said output voltage;
        a first comparator coupled to receive said first output signal and a third threshold voltage, said first comparator to generate a first disable signal as a comparison result of said first output signal and said third threshold voltage; and
        a second comparator coupled to receive said first output signal and a fourth threshold voltage, said second comparator to generate a second disable signal as a comparison result of said first output signal and said fourth threshold voltage; and
    wherein said first node is one of an output node and an output steering node of said voltage regulator.

2. The voltage regulator of claim 1, further comprising a resistive voltage-divider circuit coupled between said output node and said second constant reference potential, said resistive voltage-divider circuit providing a feedback voltage on a feedback terminal, wherein said feedback voltage is a smaller fraction of said regulated output voltage,
    wherein said slew-up circuit comprises:
        a third comparator coupled to receive a scaled-down version of said first threshold voltage and said feedback voltage, said third comparator designed to generate a first signal as a comparison result of said scaled-down version of said first threshold voltage and said feedback voltage, wherein said first signal is designed to drive a control terminal of said first transistor with a first magnitude;
        a first transistor coupled to receive said first signal on said control terminal of said first transistor, wherein a first current terminal of said first transistor is coupled to said first node;
        a first switch coupled between said first constant reference potential and a second current terminal of said first transistor, wherein said first switch is operable to be closed or open by said first disable signal,
    wherein said first transistor is switched ON to couple said first node of said voltage regulator to said first constant reference potential when said feedback voltage is less than said scaled-down version of said first threshold voltage, wherein said first transistor is OFF when said feedback voltage is greater than said scaled-down version of said first threshold voltage,
    wherein said first disable signal opens said first switch to disable said slew-up circuit if said first output signal is greater than said third threshold voltage, wherein said first disable signal closes said first switch when said first output signal is less than said third threshold voltage, and
    wherein said slew-up circuit, when enabled by said first signal, is designed to generate a slew-up current with a first magnitude.

3. The voltage regulator of claim 1, wherein said slew-down circuit comprises:
    a fourth comparator coupled to receive a scaled-down version of said second threshold voltage and said feedback voltage, said fourth comparator to generate a second signal as a comparison result of said scaled-down version of said second threshold voltage and said feedback voltage, wherein said second signal is designed to drive a control terminal of said second transistor with a second magnitude;
    a second transistor coupled to receive said second signal on said control terminal of said second transistor, wherein a first current terminal of said second transistor is coupled to said first node;
    a second switch coupled between said second constant reference potential and a second current terminal of said second transistor, wherein said second switch is operable to be closed or open by said second disable signal,
    wherein said second transistor is switched ON to couple said first node of said voltage regulator to said second constant reference potential when said feedback voltage is greater than said scaled-down version of said second threshold voltage, wherein said second transistor is OFF when said feedback voltage is less than said scaled-down version of said second threshold voltage,
wherein said second disable signal opens said second switch to disable said slew-down circuit if said second output signal is less than said fourth threshold voltage, wherein said second disable signal closes said first switch when said second output signal is greater than said fourth threshold voltage, and
wherein said slew-down circuit, when enabled by said second signal, is designed to generate a slew-down current with a second magnitude.

4. The voltage regulator of claim 3, wherein said transient response control circuit further comprises:
a first circuit to reduce said drive of said control terminal of said first transistor to a value smaller than said first magnitude for a predetermined interval immediately following said overshoot of said regulated output voltage; and
a second circuit to reduce said drive of said control terminal of said second transistor to a value smaller than said second magnitude for said predetermined interval immediately following said undershoot of said regulated output voltage.

5. The voltage regulator of claim 4, wherein:
said first circuit comprises a series combination of a first capacitor and a first current-controlled current source, wherein a junction of said first capacitor and said first current-controlled current source is coupled to said control terminal of said first transistor, wherein said first current-controlled current source is controlled by said slew-down current, and
said second circuit comprises a parallel combination of a second capacitor and a second current-controlled current source, said parallel combination being coupled between said control terminal of said second transistor and said second constant reference potential, wherein said second current-controlled current source is controlled by said slew-up current.

6. The voltage regulator of claim 4, wherein said voltage regulator is a linear regulator comprising:
a pass-transistor, wherein a first current terminal is coupled to receive said input voltage, wherein a second current terminal of said pass-transistor is coupled to said output node of said linear regulator and provides said regulated output voltage;
an error amplifier coupled to receive a reference voltage on a first input terminal and said feedback voltage on a second input terminal, said error amplifier designed to generate an error signal representing a difference between said reference voltage and said feedback voltage,
wherein a control terminal of said pass-transistor is coupled to receive said error signal,
wherein said first node is said output steering node of said linear regulator, and
wherein said output steering node is said control terminal of said pass-transistor.

7. The voltage regulator of claim 4, wherein said voltage regulator is a linear regulator comprising:
a pass-transistor, wherein a first current terminal is coupled to receive said input voltage, wherein a second current terminal of said pass-transistor is coupled to said output node of said linear regulator and provides said regulated output voltage;
an error amplifier coupled to receive a reference voltage on a first input terminal and said feedback voltage on a second input terminal, said error amplifier designed to generate an error signal representing a difference between said reference voltage and said feedback voltage,
wherein a control terminal of said pass-transistor is coupled to receive said error signal, and
wherein said first node is said output node of said linear regulator.

8. A system comprising:
a power terminal coupled to a power source; and
a power supply unit coupled to receive power from said power terminal, said power supply unit comprising a first voltage regulator coupled to receive said power and to generate a first lower supply voltage,
wherein said first voltage regulator comprises:
a slew-up circuit designed to couple a first node of said voltage regulator to a first constant reference potential upon occurrence of a first condition of said first lower supply voltage, wherein said first condition comprises an undershoot of said first lower supply voltage to a level less than a first threshold voltage;
a slew-down circuit designed to couple said first node to a second constant reference potential upon occurrence of a second condition of said first lower supply voltage, wherein said second condition comprises an overshoot of said first lower supply voltage to a level greater than a second threshold voltage;
a transient response control circuit designed to disable said slew-up circuit upon a rate of change of said first lower supply voltage with respect to time, changing from a negative value to a positive value subsequent to occurrence of said first condition, said rate of change representing a slope of said first lower supply voltage when plotted against time, wherein a magnitude of said rate of change exceeds a predetermined rate,
said transient response control circuit designed to disable said slew-down circuit upon said rate of change changing from a positive value to a negative value subsequent to occurrence of said second condition,
wherein said transient response control circuit comprises:
a differentiator coupled to receive said first lower supply voltage, said differentiator designed to generate a first output signal with a magnitude proportional to said rate of change of said output voltage;
a first comparator coupled to receive said first output signal and a third threshold voltage, said first comparator to generate a first disable signal as a comparison result of said first output signal and said third threshold voltage; and
a second comparator coupled to receive said first output signal and a fourth threshold voltage, said second comparator to generate a second disable signal as a comparison result of said first output signal and said fourth threshold voltage, and
wherein said first node is one of an output node and an output steering node of said first voltage regulator.

9. The system of claim 8, further comprising:
an antenna;
a first duplexer coupled to said antenna; and
a first transceiver, wherein said first lower supply voltage is used to power a noise-sensitive block in said first transceiver,
said first transceiver comprising a transmitter portion and a receiver portion each coupled to said first duplexer, said first transceiver to transmit communication signals to a wireless medium via said first duplexer and said antenna, said first transceiver to also receive communication signals from said wireless medium via said first duplexer and said antenna.

10. The system of claim 9, wherein said system is a base transceiver station (BTS) system, said BTS system further comprising:
a combiner coupled to said antenna;
a plurality of duplexers, each coupled to said combiner, said plurality of duplexers including said first duplexer; and
a plurality of transceivers including said first transceiver, each of said plurality of transceivers comprising a transmitter portion and a receiver portion coupled to a corresponding one of said plurality of duplexers at one end and a base station controller (BSC) at the other end, wherein each of said plurality of transceivers is designed to transmit into said wireless medium information signals received from said BSC via the corresponding one of said plurality of duplexers, said combiner and said antenna, as well as to forward information signals received from said wireless medium via the corresponding one of said plurality of duplexers, said combiner and said antenna to said BSC;
wherein said power supply unit comprises:
a plurality of DC-DC converters coupled to receive said power from said power terminal and to generate respective supply voltages, said plurality of DC-DC converters including a first DC-DC converter to generate a first supply voltage, wherein said first supply voltage is used to power a relatively noise-insensitive block in said first transceiver, wherein said first voltage regulator is coupled to receive said first supply voltage from said first DC-DC converter to generate said first lower supply voltage; and
a plurality of voltage regulators coupled to receive a supply voltage from a corresponding one of said DC-DC converters and to generate a corresponding lower supply voltage, wherein said plurality of voltage regulators includes said first voltage regulator,
wherein supply voltages generated by one or more of said DC-DC converters are used to power relatively noise-insensitive blocks in said plurality of transceivers, and wherein supply voltages generated by one or more of said voltage regulators is used to power noise-sensitive blocks in said plurality of transceivers, and
wherein at least a second voltage regulator in said plurality of voltage regulators is implemented similar to said first voltage regulator.

11. The system of claim 8, wherein said first voltage regulator further comprises a resistive voltage-divider circuit coupled between said output node and said second constant reference potential, said resistive voltage-divider circuit providing a feedback voltage on a feedback terminal, wherein said feedback voltage is a smaller fraction of said first lower supply voltage,
wherein said slew-up circuit comprises:
a third comparator coupled to receive a scaled-down version of said first threshold voltage and said feedback voltage, said third comparator designed to generate a first signal as a comparison result of said scaled-down version of said first threshold voltage and said feedback voltage, wherein said first signal is designed to drive a control terminal of said first transistor with a first magnitude;
a first transistor coupled to receive said first signal on said control terminal of said first transistor, wherein a first current terminal of said first transistor is coupled to said first node;
a first switch coupled between said first constant reference potential and a second current terminal of said first transistor, wherein said first switch is operable to be closed or open by said first disable signal,
wherein said first transistor is switched ON to couple said first node of said voltage regulator to said first constant reference potential when said feedback voltage is less than said scaled-down version of said first threshold voltage, wherein said first transistor is OFF when said feedback voltage is greater than said scaled-down version of said first threshold voltage,
wherein said first disable signal opens said first switch to disable said slew-up circuit if said first output signal is greater than said third threshold voltage, wherein said first disable signal closes said first switch when said first output signal is less than said third threshold voltage, and
wherein said slew-up circuit, when enabled by said first signal, is designed to generate a slew-up current with a first magnitude.

12. The system of claim 11, wherein said slew-down circuit comprises:
a fourth comparator coupled to receive a scaled-down version of said second threshold voltage and said feedback voltage, said fourth comparator to generate a second signal as a comparison result of said scaled-down version of said second threshold voltage and said feedback voltage, wherein said second signal is designed to drive a control terminal of said second transistor with a second magnitude;
a second transistor coupled to receive said second signal on said control terminal of said second transistor, wherein a first current terminal of said second transistor is coupled to said first node;
a second switch coupled between said second constant reference potential and a second current terminal of said second transistor, wherein said second switch is operable to be closed or open by said second disable signal,
wherein said second transistor is switched ON to couple said first node of said voltage regulator to said second constant reference potential when said feedback voltage is greater than said scaled-down version of said second threshold voltage, wherein said second transistor is OFF when said feedback voltage is less than said scaled-down version of said second threshold voltage,
wherein said second disable signal opens said second switch to disable said slew-down circuit if said second output signal is less than said fourth threshold voltage, wherein said second disable signal closes said first switch when said second output signal is greater than said fourth threshold voltage, and
wherein said slew-down circuit, when enabled by said second signal, is designed to generate a slew-down current with a second magnitude.

13. The system of claim 12, wherein said transient response control circuit further comprises:
a first circuit to reduce said drive of said control terminal of said first transistor to a value smaller than said first magnitude for a predetermined interval immediately following said overshoot of said first lower supply voltage; and a second circuit to reduce said drive of said control terminal of said second transistor to a value smaller than said second magnitude for said predetermined interval immediately following said undershoot of said first lower supply voltage.

14. The system of claim 13, wherein said first voltage regulator is a linear regulator comprising:
a pass-transistor, wherein a first current terminal is coupled to receive said first supply voltage, wherein a second current terminal of said pass-transistor is coupled to said output node of said linear regulator and provides said first lower supply voltage;
an error amplifier coupled to receive a reference voltage on a first input terminal and said feedback voltage on a second input terminal, said error amplifier designed to generate an error signal representing a difference between said reference voltage and said feedback voltage,
wherein a control terminal of said pass-transistor is coupled to receive said error signal,
wherein said first node is said output steering node of said linear regulator, and
wherein said output steering node is said control terminal of said pass-transistor.

15. The system of claim 13, wherein:
said first circuit comprises a series combination of a first capacitor and a first current-controlled current source, wherein a junction of said first capacitor and said first current-controlled current source is coupled to said control terminal of said first transistor, wherein said first current-controlled current source is controlled by said slew-down current, and
said second circuit comprises a parallel combination of a second capacitor and a second current-controlled current source, said parallel combination being coupled between said control terminal of said second transistor and said second constant reference potential, wherein said second current-controlled current source is controlled by said slew-up current.

16. The system of claim 13, wherein said first voltage regulator is a linear regulator comprising:
a pass-transistor, wherein a first current terminal is coupled to receive said first supply voltage, wherein a second current terminal of said pass-transistor is coupled to said output node of said linear regulator and provides said first lower supply voltage;
an error amplifier coupled to receive a reference voltage on a first input terminal and said feedback voltage on a second input terminal, said error amplifier designed to generate an error signal representing a difference between said reference voltage and said feedback voltage,
wherein a control terminal of said pass-transistor is coupled to receive said error signal, and
wherein said first node is said output node of said linear regulator.

* * * * *